Feb. 5, 1957 D. D. ZEBLEY 2,780,178
REPLACEABLE TROLLEY WHEEL FOR CONVEYORS
Filed Aug. 24, 1953 2 Sheets-Sheet 1
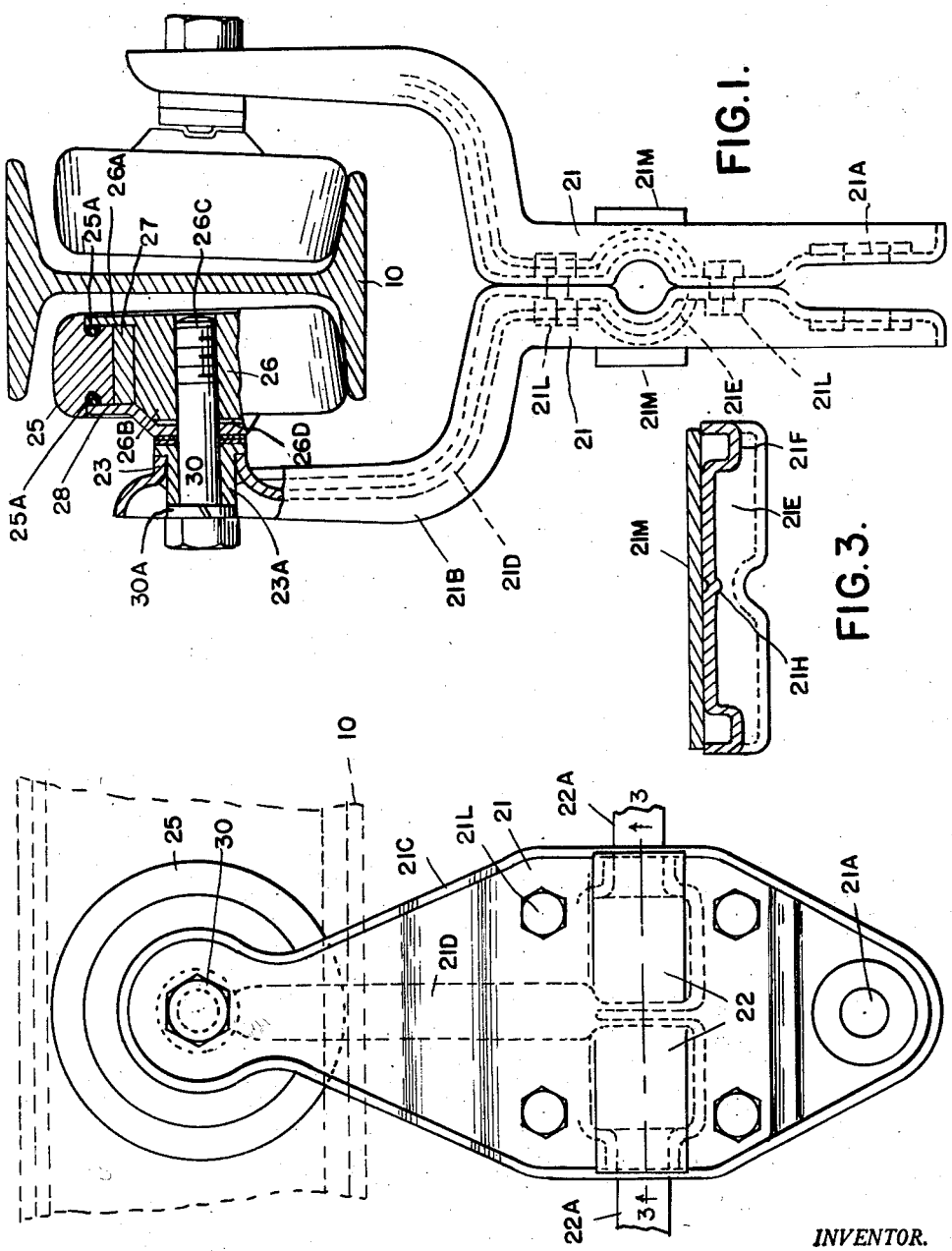
INVENTOR.
DONALD D. ZEBLEY
BY
ATTORNEYS Feb. 5, 1957 D. D. ZEBLEY 2,780,178
REPLACEABLE TROLLEY WHEEL FOR CONVEYORS
Filed Aug. 24, 1953 2 Sheets-Sheet 2
FIG.4.
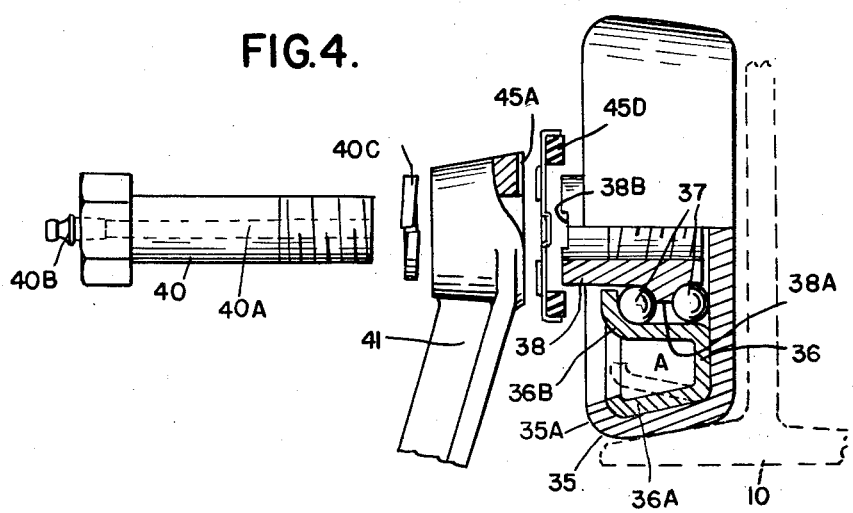
FIG.5.
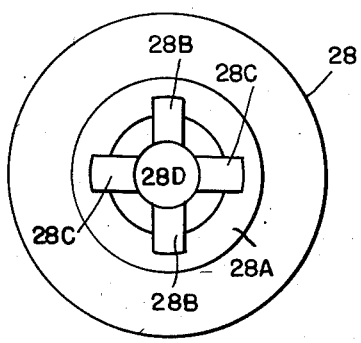
FIG.6.
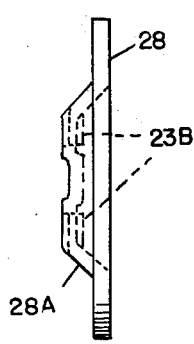
FIG.7.
FIG.8.
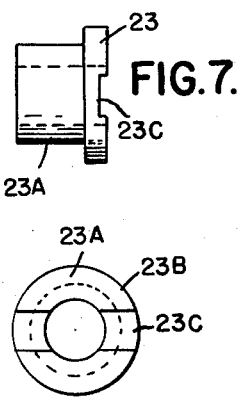
FIG.9. FIG.10.
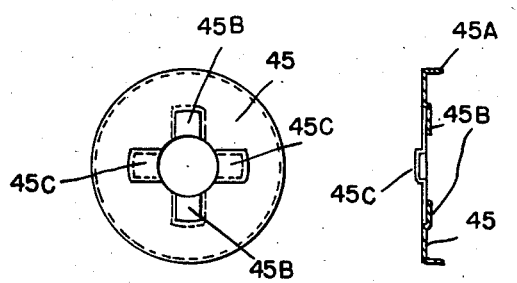
INVENTOR.
DONALD D. ZEBLEY
BY
ATTORNEYS United States Patent Office 2,780,178
Patented Feb. 5, 1957

2,780,178

REPLACEABLE TROLLEY WHEEL FOR CONVEYORS

Donald D. Zebley, Detroit, Mich.

Application August 24, 1953, Serial No. 376,079

1 Claim. (Cl. 105—148)

The present invention relates to overhead conveyors and more specifically to trolley wheels and brackets therefor.

In the conventional overhead conveyor travelling upon an I-beam track, the load supporting bracket consists of a body portion having a pair of arms extending upwardly to embrace the lower double flange of the I-beam and provided with trolley wheels adapted to travel upon the double flange.

In the usual conveyor, such wheels comprise a rim portion serving as, or carrying the outer race of a ball bearing while the inner race is fixed to a stud in turn fixed to a bracket arm, passing therethrough from the inner face, that is, the face toward the track, and secured by means of a suitable nut or nuts.

Since, in the use of the conveyor, the trolley wheels become worn and unusable, they must be replaced from time to time. Such replacement is difficult and time consuming and requires the shut down of the conveyor.

Among the objects of the present invention is to provide a bracket and wheel construction that will not only extend the time between replacements, but will enable such replacement to be accomplished in a fraction of the time now required and even permit such replacement without shut down of the conveyor.

Another object is the provision of a wheel construction that is less expensive to make and longer lived.

Still other objects will readily appear to those skilled in the art upon reference to the following description and the accompanying drawings in which Fig. 1 is a view in elevation with part in section showing a bracket-wheel assembly.

Fig. 2 is a side elevation of the same.

Fig. 3 is a section on line 3—3 of Fig. 2.

Fig. 4 is an exploded view, partially in section showing the wheel mounting and also a modified form of wheel.

Figs. 5 to 10 show details of the construction.

In the drawings, there is shown at 10 a sectional view of a conventional track for the conveyor, this consisting of an I-beam upon the lower double flange of which roll the trolley wheels mounted upon the load supporting brackets.

The brackets of the present invention consist of two identical members each of which consists of a body portion 21 having at its lower end an eye 21A, by means of which the load may be attached, and at the upper end, an arm 21B displaced from the plane of the body so that, when the two members are fixed together, the arms are spaced sufficiently to embrace the lower flange of track 20.

As shown, each bracket member consists of a stamping having a peripheral flange 21C, a stiffening rib 21D for the arm portion and a laterally extending semicylindrical recess 21E. This recess 21E is of a smaller radius for a short distance at each end as at 21F and provided with a centrally located rib 21H so that when the two bracket members are fixed together as by bolts 21L, the recesses together form a cylindrical cavity open through restricted openings and divided by a central rib. This cavity is designed to receive the cylindrical heads 22 fixed to cable links 22A. Further, fixed to the flanges on the outer face of the body, as by welding or brazing, is a flat plate 21M, its width being about the same as the diameter of the recess 21E.

At the upper end of each arm, the metal is formed into a short tubular portion 23 extending inwardly of the arm and into this is fitted and fixed, by brazing, welding, or the like, a nipple 23A, shown in detail in Figs. 7 and 8, as having a wide fairly heavy flange 23B provided with a diametrical channel 23C.

The trolley wheel of Fig. 1 consists of a tread member 25, an inner member 26, an intermediate bearing bushing 27 and a retainer plate 28.

The tread member 20 is T-shaped in section, the crossbar of the T being the tread portion and the stem being an inwardly projecting thick flange with grooves 25A in its walls adjacent the crossbar for the reception of felt washers. The inner member 26 is cylindrical for the greater portion of its length and terminates in a wide flange 26A at one end and at the other end is beveled as shown at 26B. Member 26 is also bored axially, the bore being threaded about half its length as indicated at 26C. Further, the flat face of member 26 at the beveled end is provided with a diametrical channel 26D similar to channel 23C in nipple 23. The cylindrical outer face of member 26 and the cylindrical inner face of the member 25 are finished as bearing faces to coact with the floating cylindrical bearing bushing 27 which consists of lubricant impregnated bearing material.

The retainer plate 28, shown in detail in Figs. 5 and 6, consists of a disc or washer of substantially the area of flange 26A having its central portion dished as shown at 28A to mate with the beveled end of member 26 and provided with a pair of ribs or tongues 28B on the inner face and another pair 28C on the outer face, the members of each pair being diametrically arranged and the pairs being at right angles to each other. The dimensions of these tongues are such as to fit the channels 23C and 26D in the nipple 23A and member 26 respectively. The plate 28 is of course provided with a central opening 28D.

In assembling the wheel and bracket, the tread 25, bushing 27 and member 26 with the felt washers in grooves 25A are put together and, with the washer retainer 28 in position, a cap screw 30 with a lock washer 30A is inserted through nipple 23A and threaded into the member 26, the washer 28 being orientated to engage the ribs 23B and 23C with the channels 23C and 23D. The washer 28 serves not only to retain the wheel parts together, but locks the member 26 against rotation both during assembly and later in operation.

In producing the parts, a small clearance will be provided for between the edges of washer 28 and flange 26A, and the adjacent faces of the tread members 25.

In the form of wheel shown in Fig. 4, the wheel is shown as consisting of an outer rim member 35 in the form of a cup having the brim edge turned inwardly as at 35A to form a flange or shoulder. Inside of cup 35 is an annulus 36, the outer wall 16A of which 36A contacts the inner wall of cup 35 and is fitted under the shoulder 35A, while the inner wall 36B of the annulus is formed to provide an outer race for a double row of balls 37.

Within the inner wall 36B and suitably spaced to receive the balls 37, is an inner race member 38 provided on its outer face with an annular rib 38A acting as a separator for the two rows of balls. The member 38 is bored axially and internally threaded. It is also provided in its outer exposed face with a shallow diametrical channel 38B, the other end is covered by the cup 35.

Coacting with the threads in member 38, is a screw 40 of such length as to extend through the bracket arm 41 and into member 38. This screw 40 will be drilled axially as at 40A and provided with a suitable nipple 40B so that a suitable lubricant may be supplied to the wheel bearing.

The bracket arm 41 will of course be bored to receive the screw 40 and in the face toward the wheel will be provided a shallow diametrical channel 41A.

Between the bracket arm and the exposed face of race member 38 is a sheet metal washer 45 shown in detail in Figs. 9 and 10. It consists of a washer having a peripheral flange 45A and two pairs of ribs or tongues 45B and 45C, of such dimensions as to fit the channels 38B and 41A above referred to. The ribs 45B protrude from the inner face and the ribs 45C from the outer face of the washer.

As shown in Fig. 4, a suitable felt washer 45D will be held by the flange 45A so that dirt will be excluded from the wheel bearing when the parts are assembled.

In assembling the wheel and bracket, the screw 40 with a suitable lock washer 40C will be passed through the bracket arm, washer 45 and into the inner race member 38, the washer 46 being orientated so that the ribs coact with channels 41A and 38B and lock the race member 38 against turning.

In assembling the wheel itself, the annulus 36 will initially have its outer wall in the position indicated in dotted lines at A. After the parts have been put in their proper location, the wall 36A is pressed outwardly to lie in the position shown.

Referring again to Figs. 1 to 3, the plates 21M are for the dual purpose of adding lateral stiffness to the stamped arm and for providing a flat surface to coact with guide rollers (not shown) used in connection with short radius lateral turns of the conveyor track.

I claim:

In a trolley wheel-bracket combination for travelling conveyors, a wheel comprising a tread element consisting of a rim having an inwardly extending intermediate flange or rib the inner edge of which is provided with a cylindrical bearing surface, an inner stationary member having an outer cylindrical bearing surface spaced from the first mentioned bearing surface, a flange on one end of said member extending radially to adjacent the rim portion of the tread element, a bushing of lubricant impregnated bearing material floating between and coacting with said bearing surfaces, a washer located at the other end of said inner member and extending radially to adjacent the rim portion of the tread element, said washer and inner member being provided with interlocking portions, and a screw passing through said bracket and washer and threaded into the inner member, said bracket and washer being provided with interlocking portions.

References Cited in the file of this patent

UNITED STATES PATENTS

| | | |
|---|---|---|
| 764,692 | Sumner | July 12, 1904 |
| 805,408 | Broadbent et al. | Nov. 21, 1905 |
| 1,367,706 | Loudenslager | Feb. 8, 1921 |
| 1,446,463 | Hoffman | Feb. 27, 1923 |
| 1,652,009 | Hoffmaster | Dec. 6, 1927 |
| 1,777,579 | Roberts | Oct. 7, 1930 |
| 1,810,578 | Schirmer | June 16, 1931 |
| 1,850,048 | Ballew | Mar. 15, 1932 |
| 1,944,713 | Koons | Jan. 23, 1934 |
| 2,073,131 | Webb | Mar. 9, 1937 |
| 2,250,167 | Niles et al. | July 22, 1941 |
| 2,531,704 | Schmieser | Nov. 28, 1950 |
| 2,584,610 | Pearson | Feb. 5, 1952 |
| 2,633,226 | Vogt | Mar. 31, 1953 |
| 2,645,187 | Guaragna | July 14, 1953 |
| 2,663,267 | Omsted | Dec. 22, 1953 |

FOREIGN PATENTS

| | | |
|---|---|---|
| 591,319 | Great Britain | Aug. 14, 1947 |